US010024473B2

(12) United States Patent
Bruckner et al.

(10) Patent No.: US 10,024,473 B2
(45) Date of Patent: Jul. 17, 2018

(54) HOSE COUPLING

(71) Applicant: FRONIUS INTERNATIONAL GMBH, Pettenbach (AT)

(72) Inventors: Manfred Bruckner, Kremsmuenster (AT); Wolfgang Prikler, Ansfelden (AT)

(73) Assignee: FRONIUS INTERNATIONAL GMBH, Pettenbach (AT)

( * ) Notice: Subject to any disclaimer, the term of this patent is extended or adjusted under 35 U.S.C. 154(b) by 551 days.

(21) Appl. No.: 14/427,473

(22) PCT Filed: Sep. 23, 2013

(86) PCT No.: PCT/AT2013/000153
§ 371 (c)(1),
(2) Date: Mar. 11, 2015

(87) PCT Pub. No.: WO2014/047665
PCT Pub. Date: Apr. 3, 2014

(65) Prior Publication Data
US 2015/0247598 A1    Sep. 3, 2015

(30) Foreign Application Priority Data

Sep. 25, 2012    (AT) ................................ A 1043/2012

(51) Int. Cl.
B23K 9/12        (2006.01)
F16L 37/086      (2006.01)
(Continued)

(52) U.S. Cl.
CPC ............ *F16L 37/086* (2013.01); *B23K 9/125* (2013.01); *B23K 9/1336* (2013.01); *B23K 9/173* (2013.01);
(Continued)

(58) Field of Classification Search
CPC ........ B65H 5/22; B65H 23/06; B65H 23/066; B65H 23/063; B21D 43/10; B23K 9/12;
(Continued)

(56) References Cited

U.S. PATENT DOCUMENTS 5,540,250 A * 7/1996 Mullins ............... F16L 55/1015
137/75
2004/0144827 A1 * 7/2004 Fox ......................... B21F 23/00
226/151
2008/0159825 A1    7/2008 Tegg

FOREIGN PATENT DOCUMENTS

AT          513432      8/2014
GB          1 327 859   8/1973
(Continued)

OTHER PUBLICATIONS

International search report, dated Nov. 3, 2014.

*Primary Examiner* — Brian Jennison
(74) *Attorney, Agent, or Firm* — Greenblum & Bernstein, P.L.C.

(57) ABSTRACT

A device for releasable fixed holding of a welding wire in a welding wire guide is described. This device is characterized in that the welding wire guide includes a cage for radially displaceable braking bodies, wherein a locking cone surrounds the braking bodies, and that, of the two cooperating functional elements, formed on the one hand by the welding wire guide and on the other hand by the locking cone, one is mounted in a non-displaceable manner in a holder and the other is mounted to be axially displaceable against a spring force with respect to the non-displaceable functional element.

8 Claims, 4 Drawing Sheets

Figure 1:
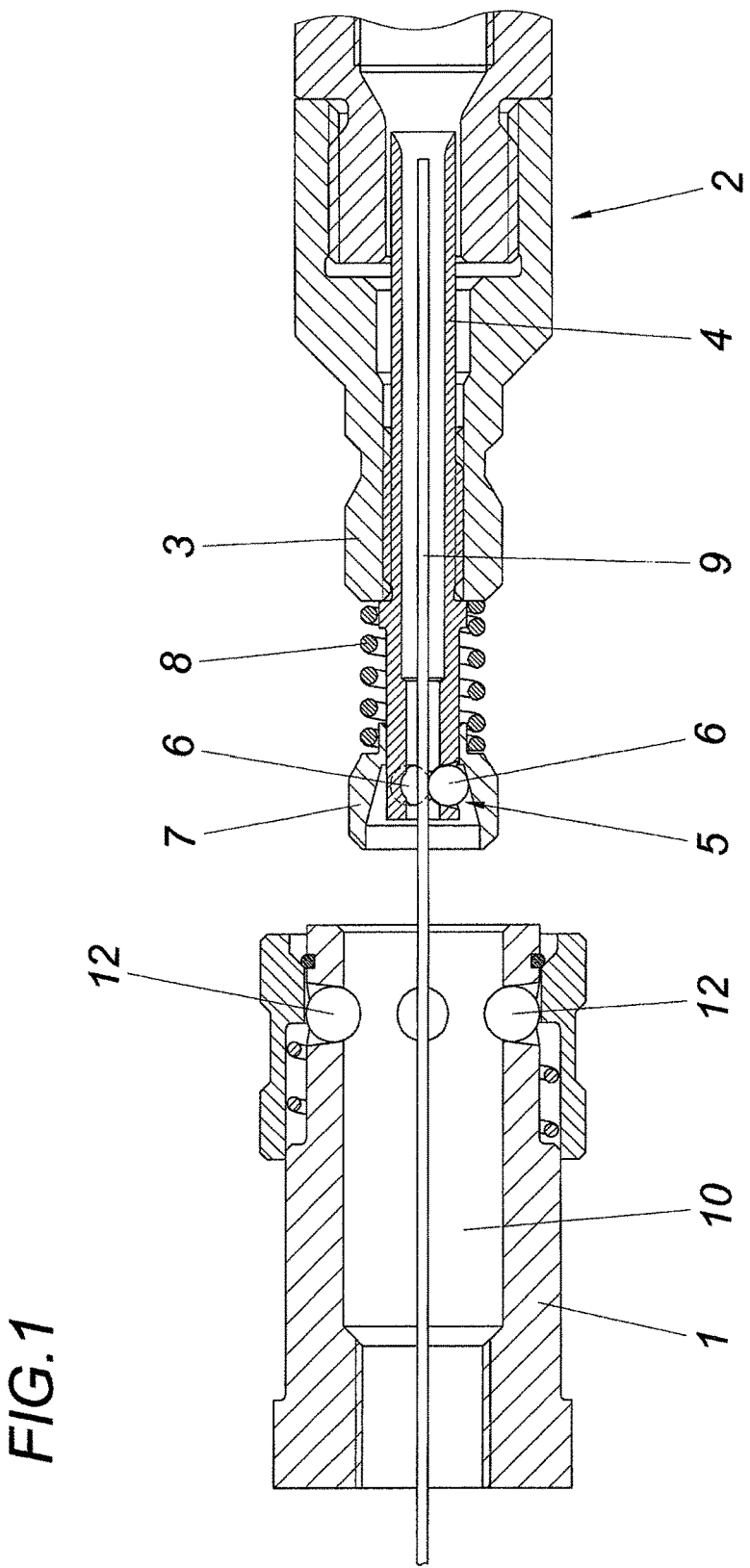

(51) Int. Cl.
*B23K 9/133* (2006.01)
*B23K 9/173* (2006.01)
*B65H 51/18* (2006.01)
*B23K 9/32* (2006.01)
*F16L 21/00* (2006.01)
*F16L 37/23* (2006.01)

(52) U.S. Cl.
CPC ............... *B23K 9/32* (2013.01); *B65H 51/18* (2013.01); *F16L 21/00* (2013.01); *F16L 37/23* (2013.01); *B65H 2701/36* (2013.01)

(58) Field of Classification Search
CPC ...... B23K 9/125; B23K 9/133; B23K 9/1336; B23K 9/173; B23K 9/32
USPC ..................................................... 219/137.44
See application file for complete search history.

(56) References Cited

FOREIGN PATENT DOCUMENTS

| | | |
|---|---|---|
| JP | S54-129524 U | 9/1979 |
| JP | S55-153677 | 11/1980 |
| JP | S61-23540 | 2/1986 |
| JP | H07 96369 | 4/1995 |
| SU | 929 361 | 5/1982 |
| SU | 1556841 | 7/1988 |

\* cited by examiner

HOSE COUPLING

The invention relates to a hose coupling, in particular to a hose coupling for connecting a guide hose for a welding wire.

In the case of welding wires which are unwound from a supply spool and conventionally delivered through a guide hose, the welding wire should, under certain operating conditions, be axially fixedly held with respect to its guide, for example in the region of a hose coupling for connection of the guide hose or in the region of a burner, so that the burner-side end of the welding wire cannot be displaced axially with respect to the burner.

JP S61 23540 A describes a wire feed device in which a wire to be fed is guided through a core which has a trapezoidally tapering cross-section. The core is inserted in a wedge-like manner into an aperture in a clamping element, wherein the aperture likewise has a trapezoidally tapering cross-section. Freely moveable cylindrical rollers are introduced into openings in the core and adjoin both the wire and also the inner surface of the aperture. By means of a lever the clamping element can be moved in a feed direction, whereby the core is pressed against the aperture. The rollers are subsequently pressed against the wire by the inner surface of the aperture and fixedly hold this wire, whereby the movement can be transferred to the wire in the feed direction of the clamping element. If the clamping element then moves back, the rollers are released from the wire, the wire remaining in the changed position and the process can be repeated.

GB 1 327 859 A describes a wire feed device with a pneumatically operated piston. A clamp is disposed around a wire on each side of the piston in the axial direction of the wire and can fixedly hold the wire by balls being pressed against the wire. In dependence upon the movement of the piston the clamps are opened and closed in such a way that the wire is fed in a feed direction by regular back and forth movements of the piston.

JP S54 129524 U describes a solder wire feed device in which, in order to feed the solder wire, the solder wire is clamped between a conical aperture and balls positioned radially around the solder wire, and is then carried along therewith a piece at a time.

US 2008/159825 A1 describes a self-locking wire lock. The wire is axially guided through an opening which has a portion with a tapering cross-section. A clamping element with a plurality of spherical braking elements is at least partially introduced into the opening. A spring acts upon the clamping element in the direction of the portion with the tapering cross-section in order to fixedly hold the wire by the braking elements in the opening by means of a spring force which can be adjusted via a setting screw.

JP H07 96369 describes a wire feed device in which the wire is guided in a moveable clamping element through an opening which tapers in a wedge-like manner in the axial direction and in which balls are disposed. The clamping element can be moved by means of an electromagnet, whereby the wire is fixedly held by the balls which are pressed radially inwards by the wedge shape of the opening. If the electromagnet is switched off, the clamping element moves back by reason of a spring force, the braking elements releasing the wire. Therefore, the wire can be fed piece by piece.

SU 929 361 A1 describes a wire feed device in which, by activation of an electromagnet, two clamping elements are moved towards one another. Balls are disposed in the clamping elements in a respective chamber with a cross-section with wedge-shaped portions, the wire being guided through between these balls. The wire is fixedly held by balls in the wire guide element located therebehind in the feed direction, these balls being pressed radially inwards by the wedge-shaped portion of the chamber, which tapers opposite to the feed direction. Upon deactivation of the electromagnet, the wire guide elements move away from one another by reason of a spring force, the wire remaining in its changed position. The wire can be fed piece by piece by repeated performance of this process.

JP S55 153677 A describes a wire feed device with two electromagnets. By activation of one of the electromagnets a wire guide element, through which the wire is guided, is moved towards a suction plate. A clamping element surrounding the wire is pressed against a spring force in a wedge-like manner against an opening in the wire guide element, which tapers opposite to the feed direction, whereby the wire is fixedly held and is carried along with the wire guide element. By deactivation of the first electromagnet and activation of the second electromagnet the wire feed device is returned to the starting condition, the wire remaining in its changed position. The wire can be fed piece by piece by repeated performance of this process.

The object of the invention is to provide a hose coupling of comparatively simple construction for guiding a welding wire, this coupling also having securing mechanisms in the event of undesired release of the hose coupling.

By the provision of two functional elements which are axially displaceable with respect to one another, one of which forms a welding wire guide with a cage for radially displaceable braking bodies and the other of which forms a locking cone for these braking bodies, advantageous prerequisites for secure retention of the welding wire within the welding wire guide are ensured because, with the relative displacement of the locking cone with respect to the welding wire guide passing through the locking cone, the braking bodies are pressed radially against the welding wire via the locking cone and fixedly clamp said wire. In order to release this retention, the locking cone merely needs to be displaced in the unlocking direction with respect to the welding wire guide, and thus the braking bodies are released and the welding wire can be delivered unhindered through the welding wire guide. The spring force acting between the welding wire guide and the locking cone can, depending on the individual application, be used to ensure free delivery of the welding wire or retention of the welding wire. The spring force is set accordingly by selection of the spring and accordingly adapted to the diameter of the welding wire.

If the welding wire retention is used in conjunction with a hose coupling to connect a guide hose for the welding wire, simple construction conditions are achieved when the holder for the two functional elements forms one of two coupling parts of a hose coupling which can be plugged into one another, the other coupling part of which has a setting stop for the functional element which is mounted in an axially displaceable manner and is acted upon by a spring in the locking direction. By reason of the spring acting in the locking direction, the welding wire is, upon release of the coupling, retained within the welding wire guide via the locking cone acting on the braking bodies. Upon coupling, the two coupling parts are plugged into one another, wherein the functional element loaded by the spring in the locking direction abuts a setting stop of the opposite coupling part and is held back thereby against being carried along further, and so during passage along the rest of the coupling path the axially displaceable functional element is displaced against the force of the spring with respect to the functional element non-displaceably mounted in the holder and thus the braking bodies are released by the locking cone. When the coupling of the two coupling parts of the hose coupling is complete, the welding wire retention produced when the coupling is open is thus automatically released.

Although the function of the welding wire retention does not depend on whether the welding wire guide is mounted in an axially displaceable manner with respect to the locking cone or whether the locking cone is mounted in an axially displaceable manner with respect to the welding wire guide, particularly favourable construction conditions are achieved when the holder forms a plugging shoulder of the coupling part and when the locking cone is displaceably guided on the non-displaceable welding wire guide lengthening the plugging shoulder. In this case, there is no relative movement produced between the welding wire guide and the welding wire during either locking or unlocking. For the locking cone displaceably mounted on the welding wire guide, an advantageous movement path is produced because the welding wire guide lengthens the plugging shoulder of the coupling part, this also resulting in advantageous construction conditions for the restraining stop of the coupling part receiving the plugging shoulder, which coupling part in the coupled state surrounds the welding wire retention with the spring in protective manner.

When the welding wire retention is used in the region of a burner, the holder can comprise a cylinder for a piston loaded by the spring force and drivingly connected to the displaceably mounted functional element, this piston being suitable to be acted upon against the spring force by a pressure medium. Depending on the direction of action of the spring force, the welding wire is retained or released within the welding wire guide by the piston being subjected to pressure medium. It is generally advantageous in this respect if the welding wire guide mounted in an axially displaceable manner in the holder comprises the piston which is acted upon by the spring force in the unlocking direction and if the holder forms the locking cone. In this case, the spring force ensures that the wire retention is unlocked, this only being activated when the piston is appropriately acted upon by a pressure medium.

Generally it is thus also advantageous that during servicing, parts change or the like, but also for so-called teaching procedures, the welding wire can be fixed in its position. This fixing is independent of the wire feed motor, or the wire feed motor registers the fixing and stops the delivery of the welding wire during fixing. Therefore, the wire feed motor, which is often disposed remotely and in other rooms, does not have to be switched off and on manually.

Figure 2:
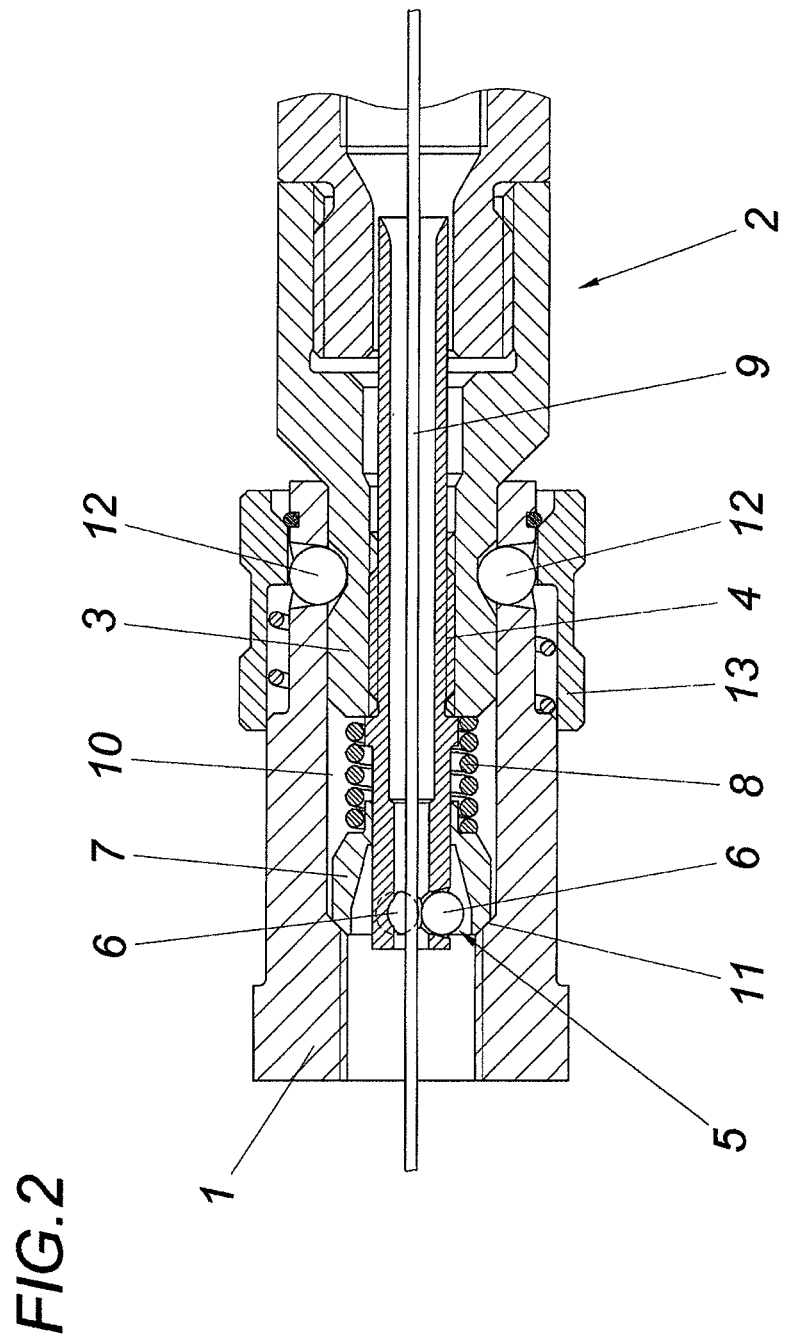
Figure 3:
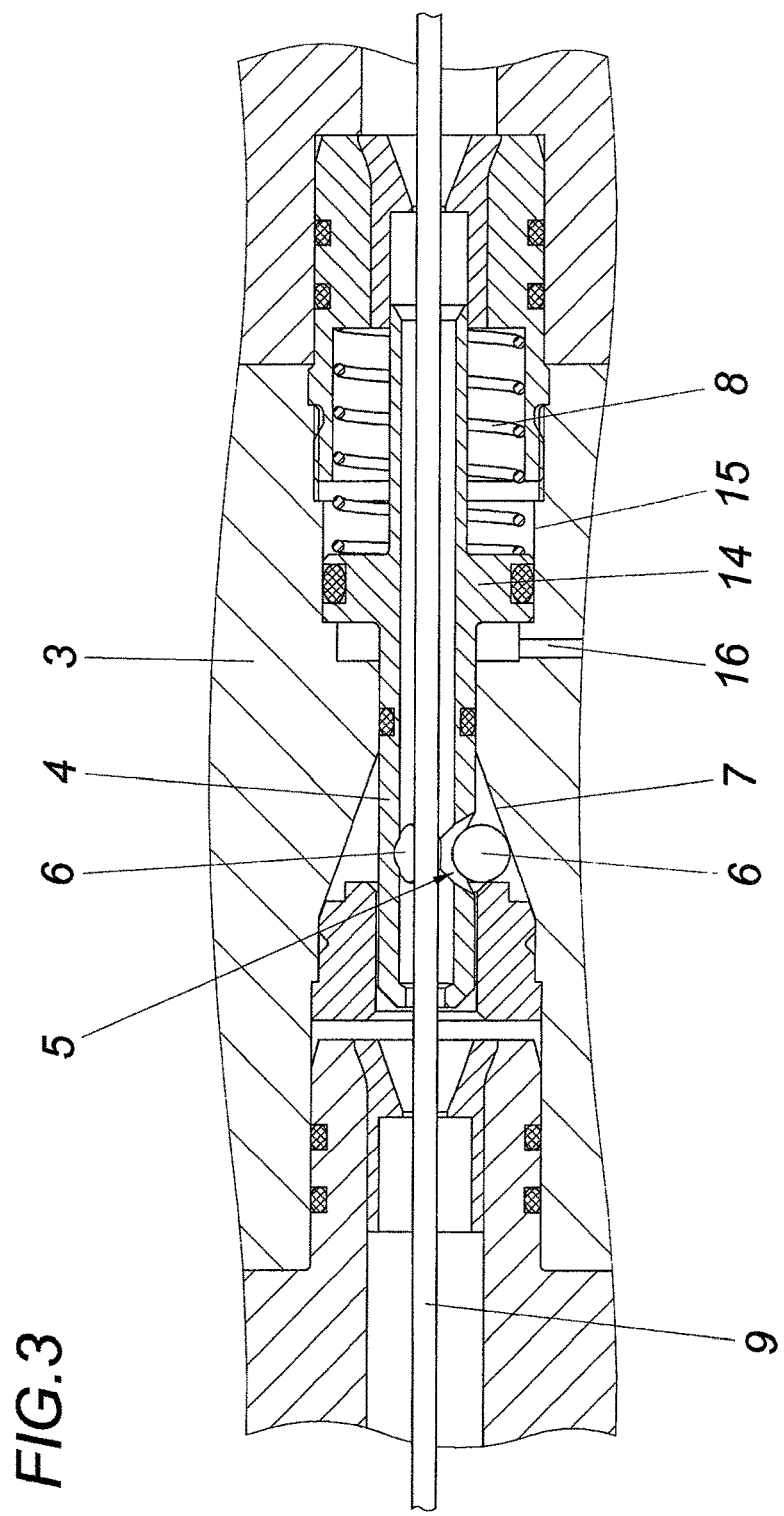
Figure 4:
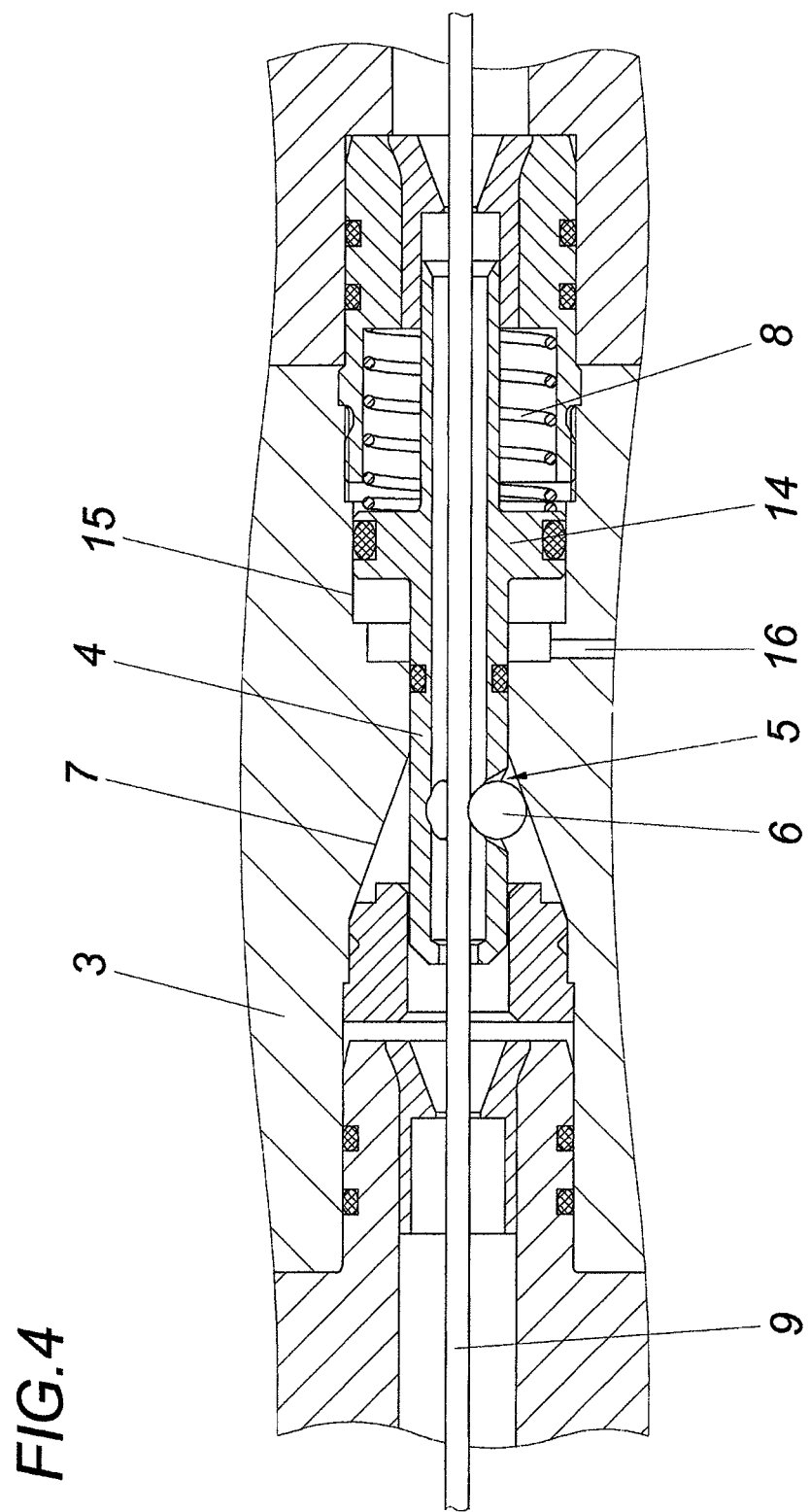

The subject matter of the invention is illustrated by way of example in the drawing, in which FIG. 1 shows a simplified longitudinal cross-sectional view of a device in accordance with the invention for releasable fixed holding of a welding wire, using the example of a hose coupling with mutually separate coupling parts, FIG. 2 shows the hose coupling of FIG. 1 in the coupled state, FIG. 3 shows a simplified longitudinal cross-sectional view of an exemplified device in conjunction with a welding burner, not shown in more detail, in the unlocked position and FIG. 4 shows the exemplified device of FIG. 3 in the locked position.

In FIGS. 1 and 2, a hose coupling is provided having two coupling parts 1, 2 which can be plugged into one another, of which one coupling part 2 has a holder 3—forming a plugging shoulder of the coupling part 2—for a sleeve-like welding wire guide 4 which, in the proximity of its end region lengthening the plugging shoulder, forms a cage 5 for radially moveable spherical braking bodies 6. A locking cone 7 is mounted in an axially displaceable manner on this welding wire guide 4 connected in a non-displaceable manner to the holder 3, which locking cone cooperates via its run-up surfaces with the braking bodies 6 and is acted upon in the locking direction by a spring 8 which bears on the one hand against the holder 3 and on the other hand against the locking cone 7. As shown in FIG. 1, the locking cone 7 being acted upon by the spring therefore effects radial pressing of the spherical braking bodies 6 against the welding wire 9 extending through the welding wire guide 4. For example, three braking bodies 6 are each disposed offset by 120° for this purpose. The locking cone 7 thus also accordingly surrounds the braking bodies 6. Therefore, corresponding retention of the welding wire is effected, as can be seen in FIG. 1. The position of the axially delivered welding wire 9 is thus fixed by the braking bodies 6 when the coupling parts 1, 2 are opened or not coupled. Therefore, the welding wire 9 constitutes resistance for a wire feed motor and so this motor automatically stops delivery. A wire feed motor of this type and its arrangement in a wire feed device, a welding burner or the like are sufficiently known from the prior art, for which reason this is not illustrated and not discussed in more detail.

If the two coupling parts 1 and 2 are plugged into one another as shown in FIG. 2, the welding wire guide 4 engages with the locking cone 7 into the plug-in opening 10 of the coupling part 1 until the locking cone 7 abuts a restraining stop 11 of the coupling part 1 and is prevented from penetrating further into the plug-in opening 10. This means that the locking cone 7 is displaced against the force of the spring 8 in the unlocking direction on the welding wire guide 4 until the coupling position secured by latching balls 12 of the coupling part 1 is reached, in which the spherical braking bodies 6 are completely released by the locking cone 7 so that the welding wire 9 can be delivered through the welding wire guide 4 unhindered by the wire retention formed by the braking bodies 6.

In order to release the hose coupling, the latching balls 12 of the coupling part 1 are first to be released by a securing sleeve 13, which can be axially displaced against a spring force, before the two coupling parts 1 and 2 can be moved apart. The locking cone 7 is thus pressed via the spring 8 9 into the locking position of FIG. 1, whereby the welding wire is fixedly clamped in the welding wire guide 4 via the braking bodies 6.

In FIGS. 3 and 4, an exemplified device for releasable fixed holding of the welding wire 9 is shown in conjunction with a welding burner which is not shown in more detail since this burner is sufficiently known from the prior art. The welding wire guide 4 displaceably guided in a holder 3 forms a piston 14 of a cylinder 15 provided in the holder 3. This piston 14 is loaded on one side by a spring 8 and can be acted upon against the spring force by a pressure medium via a pressure medium connection 16 on the opposite side. The spherical braking bodies 6 are held in a cage 5 on the side of the welding wire guide 4 remote from the spring 8 and cooperate with a locking cone 7 formed by the holder 3. The locking cone 7 thus surrounds the braking bodies 6 which are arranged offset by the respective number of degrees according to how many of them there are, i.e. offset by 120° when there are three braking bodies 6.

If the pressure medium connection 16 is not being supplied, the spring 8 becomes active and acts upon the welding wire guide 4 in the unlocking direction via the piston 14 and so the braking bodies 6 are released by the locking cone 7 and the welding wire 9 can be delivered unhindered through the welding wire guide 4, as shown in FIG. 3.

If the piston 14 is acted upon by a pressure medium via the pressure medium connection 16, i.e. is supplied e.g. with compressed air, the welding wire guide 4 will be moved in the locking direction against the force of the spring 8, wherein the spherical braking bodies 6 are pressed radially against the welding wire 9 via the locking cone 7 and fixedly clamp the wire against axial displacement as shown in FIG. 4 as long as the actuating pressure of the piston 14 is maintained by the pressure medium.

The invention claimed is:

1. Hose coupling having:
   a first coupling part which comprises a restraining stop; and
   having a second coupling part which forms a holder for a welding wire guide; wherein the welding wire guide is mounted in a non-displaceable manner in the holder;
   wherein the first coupling part and the second coupling part can be plugged into one another;
   wherein the welding wire guide comprises radially displaceable braking bodies which are surrounded by a locking cone which is mounted to be axially displaceable against a spring force with respect to the non-displaceably mounted welding wire guide;
   wherein, when the two coupling parts of the hose coupling are in an uncoupled state, the radially displaceable braking bodies are pressed against the welding wire by the locking cone in order to fixedly hold the welding wire; and
   wherein, when the two coupling parts of the hose coupling are in a coupled state, the locking cone abuts against the restraining stop of the first coupling part in such a way that the radially displaceable braking bodies are released so that the welding wire can be delivered unhindered through the welding wire guide.

2. Hose coupling as claimed in claim 1, wherein the radially displaceable braking bodies are released by the locking cone in that during coupling of the two coupling parts of the hose coupling, the locking cone abuts against the restraining stop in such a way that the locking cone is displaced with respect to the welding wire guide against the spring force.

3. Hose coupling as claimed in claim 2, characterised in that the holder forms a plugging shoulder of the second coupling part, and that the locking cone is displaceably guided on the non-displaceable welding wire guide lengthening the plugging shoulder.

4. Hose coupling as claimed in claim 1, wherein the spring force is exerted by a spring which bears against the holder and against the locking cone.

5. Hose coupling as claimed in claim 1, wherein the locking cone is acted upon in the locking direction by the spring force in order to press the radially displaceable braking bodies against the welding wire when the two coupling parts of the hose coupling are in the uncoupled state.

6. Hose coupling as claimed in claim 1, wherein the braking bodies are formed as three spherical braking bodies each disposed offset by 120°.

7. Hose coupling as claimed in claim 1, wherein, in order to secure the two coupling parts of the hose coupling in the coupled state to prevent the two coupling parts from being moved apart from one another, the first coupling part comprises latching balls which can be fixed by means of a securing sleeve which can be axially displaced against a further spring force.

8. Hose coupling as claimed in claim 1, characterised in that the holder comprises a cylinder for a piston loaded by the spring force and drivingly connected to the locking cone, this piston being suitable to be acted upon against the spring force by a pressure medium.

\* \* \* \* \*